United States Patent [19]

Wolf

[11] Patent Number: 4,573,225
[45] Date of Patent: Mar. 4, 1986

[54] CONVERTIBLE SEAT-BED AND STORAGE UNIT

[76] Inventor: Robert Wolf, 48461 Bayshore Dr., Belleville, Mich. 48111

[21] Appl. No.: 608,357

[22] Filed: May 9, 1984

[51] Int. Cl.⁴ ............................ A47C 17/12; B60N 1/10
[52] U.S. Cl. .............................................. 5/118; 5/18 R; 5/58; 296/65 R
[58] Field of Search ................ 5/118, 17, 18 R, 12 R, 5/58; 296/65 R, 170; 297/111

[56] References Cited

U.S. PATENT DOCUMENTS

| | | | |
|---|---|---|---|
| 2,670,785 | 3/1954 | Machet | 5/37 R |
| 3,006,001 | 10/1961 | Llewellyn | 5/118 |
| 3,570,025 | 3/1971 | Sullivan | 5/118 |
| 4,197,600 | 4/1980 | Slabic | 5/118 |
| 4,343,508 | 8/1982 | Heling et al. | 5/38 |
| 4,365,369 | 12/1982 | Plume | 5/38 |
| 4,389,070 | 6/1983 | Chien | 5/39 |
| 4,402,096 | 9/1983 | Atimichuk | 5/17 |

*Primary Examiner*—Alexander Grosz
*Attorney, Agent, or Firm*—Barnes & Thornburg

[57] ABSTRACT

A convertible seat-bed and storage unit comprising a pair of frame elements which support a plurality of panels in a seat configuration and which convert to support the same panels in a bed configuration. The unit has a primary storage area which remains undisturbed during the conversion process. Additional storage area is created when the unit is converted from the seat to the bed configuration. The panels are individually removable from the unit to provide free and open access to the storage areas. A preferred embodiment of the unit is well-suited for mounting in the cargo space of a van-type automotive vehicle.

22 Claims, 4 Drawing Figures

CONVERTIBLE SEAT-BED AND STORAGE UNIT

BACKGROUND AND SUMMARY OF THE INVENTION

The present invention relates generally to convertible seat-beds and, more particularly, to convertible seat-beds provided with integral storage features.

Seats or sofas which convert to form a bed are often found in vans, recreational vehicles, mobile homes, efficiency apartments, and other living/sleeping areas lacking in plentiful floor space. In residential applications, a sofa-bed typically comprises a conventional sofa having a fold-out, standard size mattress stored in the area beneath the seat cushions and seat back of the sofa. Another type of seat-bed for residential use is shown in U.S. Pat. No. 4,402,096. This patent shows a folding, three-cushion chair comprising a pair of frame members and three hinged cushions. The seat cushion is mounted on a movable support member. When the movable support is pulled forward, the second and third cushions unfold to form a three-cushion bed. Seat-beds of this type, and of the more conventional sofa-bed type, typically do not provide storage areas for articles other than the mattress or cushion panels which form the bed.

Convertible seat-beds of the types commonly used in vehicles are shown in U.S. Pat. Nos. 4,343,508 and 4,365,369. These seat-beds comprise a frame which supports a generally horizontal seat-bottom cushion, a generally vertical seat-back cushion, and a third cushion which is hingedly attached to the top of the seat back cushion. To convert this type of unit to a bed, the third cushion is pivoted in an upward direction while the seat-back cushion is simultaneously reclined rearwardly so that, in the bed configuration, these two cushions extend in the same generally horizontal plane as the seat cushion. This type of seat-bed does not provide a storage area for articles in the vehicle (except for a small amount of incidental storage area under the seat cushion) and, in fact, require that the area immediately behind the seat-bed, which is normally a cargo space, be cleared of articles before the seat-to-bed conversion can take place.

Accordingly, it is an object of this invention to provide a convertible seat-bed and storage unit which is relatively simple in design, structure and operation, while taking maximum advantage of the space available in space-limited environments.

Another object of this invention is to provide a convertible seat-bed and storage unit which has integral storage areas provided in both seat and bed configurations.

Yet another object of this invention is to provide a seat-bed and storage unit which is easily converted from seat-to bed and bed-to-seat configurations without disturbing the integral storage areas provided.

A further object of this invention is to provide a seat-bed and storage unit in which additional storage area is created when the unit is converted to the bed configuration.

A still further object of this invention is to provide a seat-bed and storage unit in which the seat and bed panels, or cushions, are easily removable to provide free access to the storage areas.

Yet still another object of this invention is to provide a seat bed and storage unit which is especially well-suited for use in the cargo space of a van-type automotive vehicle.

These and other objects are attained in a convertible seat-bed and storage unit which comprises a pair of spaced apart and opposed frame elements, a storage area located between a portion of the frame elements, a first panel extending between the frame elements to serve as a seat back when the unit is in the seat configuration and as a bed panel when the unit is in the bed configuration, and a second panel extending between the frame elements to serve as a seat bottom in the seat configuration and as a bed panel in the bed configuration. The frame elements provide support for panels at a first (relatively high) level extending in a generally horizontal plane from a first end of the frame elements to a centrally located level transition region, and at a second level, lower than the first level, extending from a second end of the frame elements to the transition region. The frame elements are also provided with means for extending the first level of support from the transition region to the second end to provide a generally horizontal support surface when the unit is in the bed configuration. The first panel is supported by the frame elements in a generally vertical plane near the transition region when serving as a seat back, and is movable to a horizontal plane at the first level of support when serving as a bed panel. The second panel is supported by the frame elements in a generally horizontal, or slightly inclined, plane at the second (lower) level of support when serving as a seat bottom, and is movable to the first level of support (where it is supported by the above-mentioned extension means) in the bed configuration. The primary storage area is located between the frame elements, in the region below the first level of support and behind the vertical seat-back panel. This storage area is undisturbed when the unit is converted from seat-to-bed and bed-to-seat configurations. Undisturbed storage area is also located under the second panel in the seat configuration, and an additional storage area is created under this panel when the seat-bed unit is converted to a bed. A third panel is preferably supported by the frame elements in a generally horizontal plane at the first level of support in a position directory above the primary storage area. The third panel is slidably supported by the elements to facilitate the conversion process. For the same reason, the first panel (i.e., the vertical seat back) is pivotably attached to the frame elements. In a preferred embodiment of the invention, all three panels are easily removed from the frame elements to provide free and open access to the storage areas.

According to another aspect of the invention, the means for extending the first level of support to the second end of the frame elements to create the generally horizontal bed surface comprises a sliding support member extendable from the transition region to the second end of each of the frame elements. In an especially preferred embodiment, the frame elements are at least partially constructed of tubular structural members and the sliding support members extend telescopically from within the tubular members when the unit is converted to the bed configuration. The frame elements may be attached to a base or, alternatively, may be free-standing frame elements. In the latter case, cross-braces may be provided connecting the frame elements together to form a unitary frame. A particularly preferred embodiment of the seat-bed and storage unit is especially well-suited for mounting in the cargo space of a van-type automotive vehicle.

Other objects, advantages and novel features will become apparent from the following detailed description of an embodiment of the invention when considered in conjunction with the accompanying drawings.

DETAILED DESCRIPTION OF THE DRAWINGS

Figure 1:
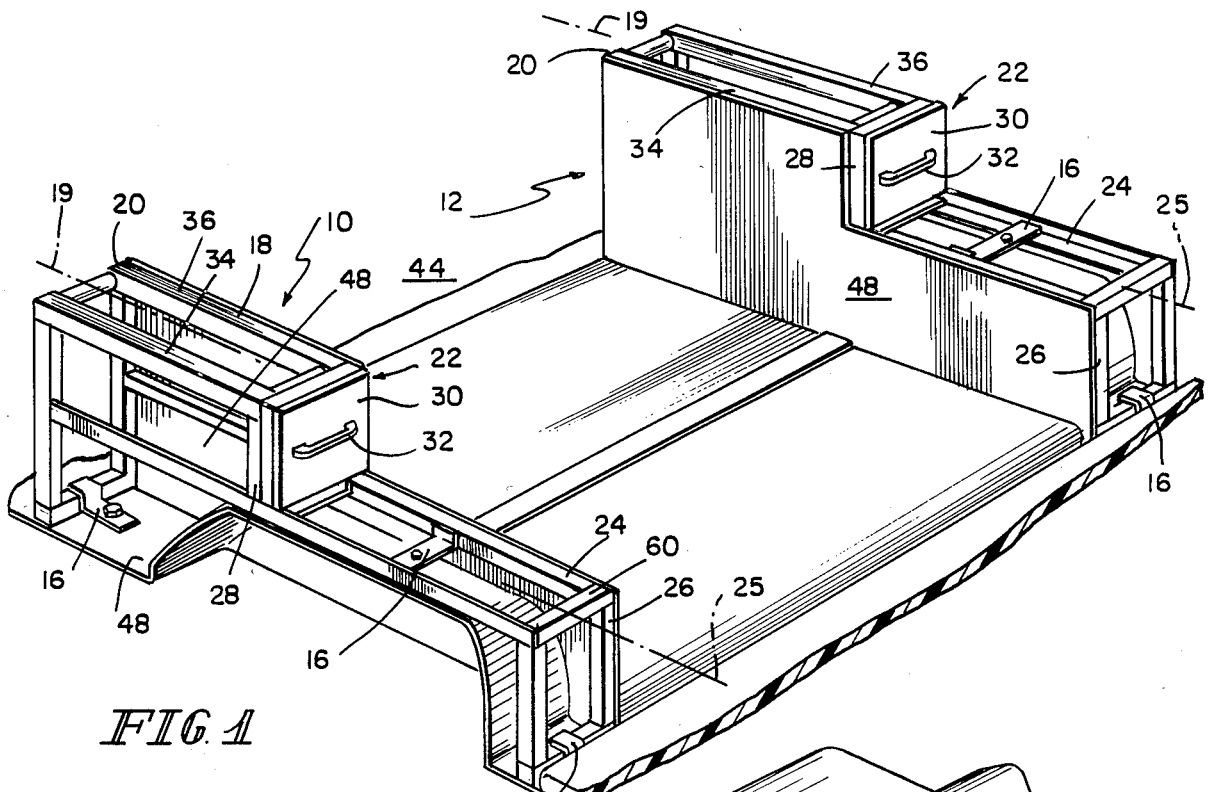
FIG. 1 shows a perspective view of the frame elements of an embodiment of the present invention installed in the cargo space of a van-type automotive vehicle.
Figure 2:
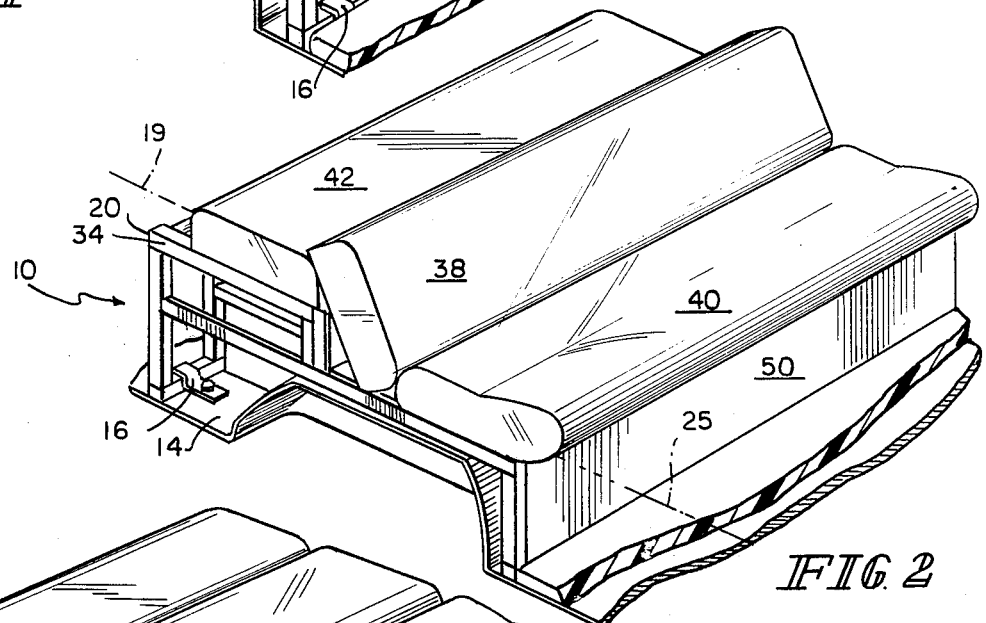
FIG. 2 shows the frame elements of FIG. 1 supporting a plurality of panels in a seat configuration.
Figure 3:
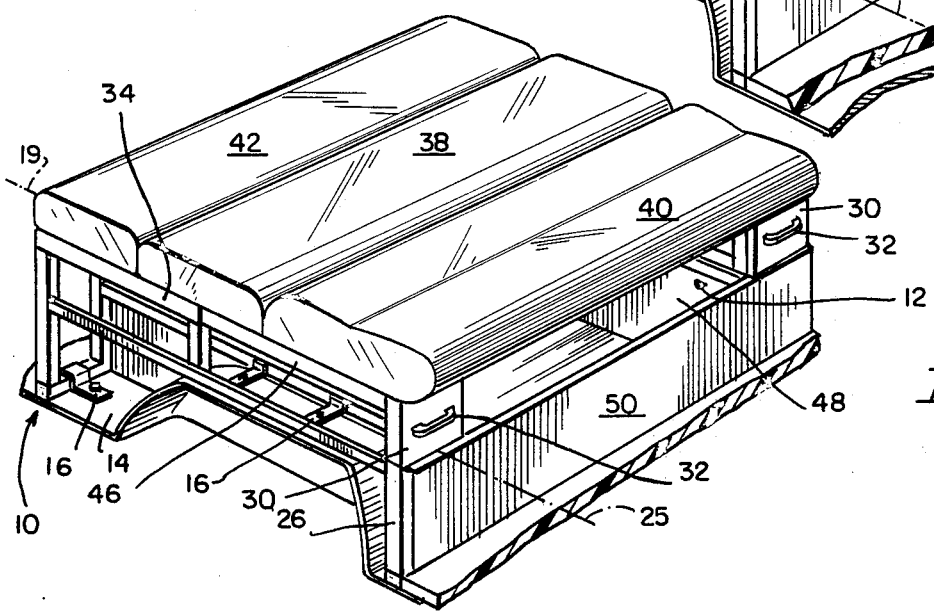
FIG. 3 shows the frame elements of FIG. 1 supporting a plurality of panels in a bed configuration.

FIGS. 1, 2 and 3 show details of a preferred embodiment of a convertible seat-bed and storage unit constructed in accordance with the present invention. FIG. 1 shows a pair of frame elements, indicated generally by reference numerals 10 and 12, which are essentially identical in construction and which are spaced apart and aligned in an opposing relationship. Frame elements 10 and 12 are shown fastened to base 14 by suitable fasteners 16. In this particular embodiment, base 14 is depicted in FIGS. 1, 2 and 3 as the floor of the cargo space of a van-type automotive vehicle. Elements 10 and 12 can be attached to other types of bases or, alternatively, may be constructed as free-standing elements to allow for freedom of positioning the unit when a larger base area is available. Cross-bracing can be added to connect elements 10 and 12 together to form a unitary frame, if desired.

As noted, frame elements 10 and 12 in this particular embodiment are essentially identical. For purposes of clarity, common features will be described by reference to frame element 10, with corresponding features of frame element 12 identified by the same reference numerals.

Frame element 10 is constructed of tubular framing members to provide first horizontal surface 18 which extends at first support level 19 from first end 20 of element 10 to a transition region, indicated generally by reference numeral 22. Second horizontal surface 24 extends at second support level 25 located below first support level 19, from second end 26 of element 10 to transition region 22. The transition between first support level 19 and second support level 25 is shown in this embodiment as a vertical offset 28 in frame element 10.

Figure 4:
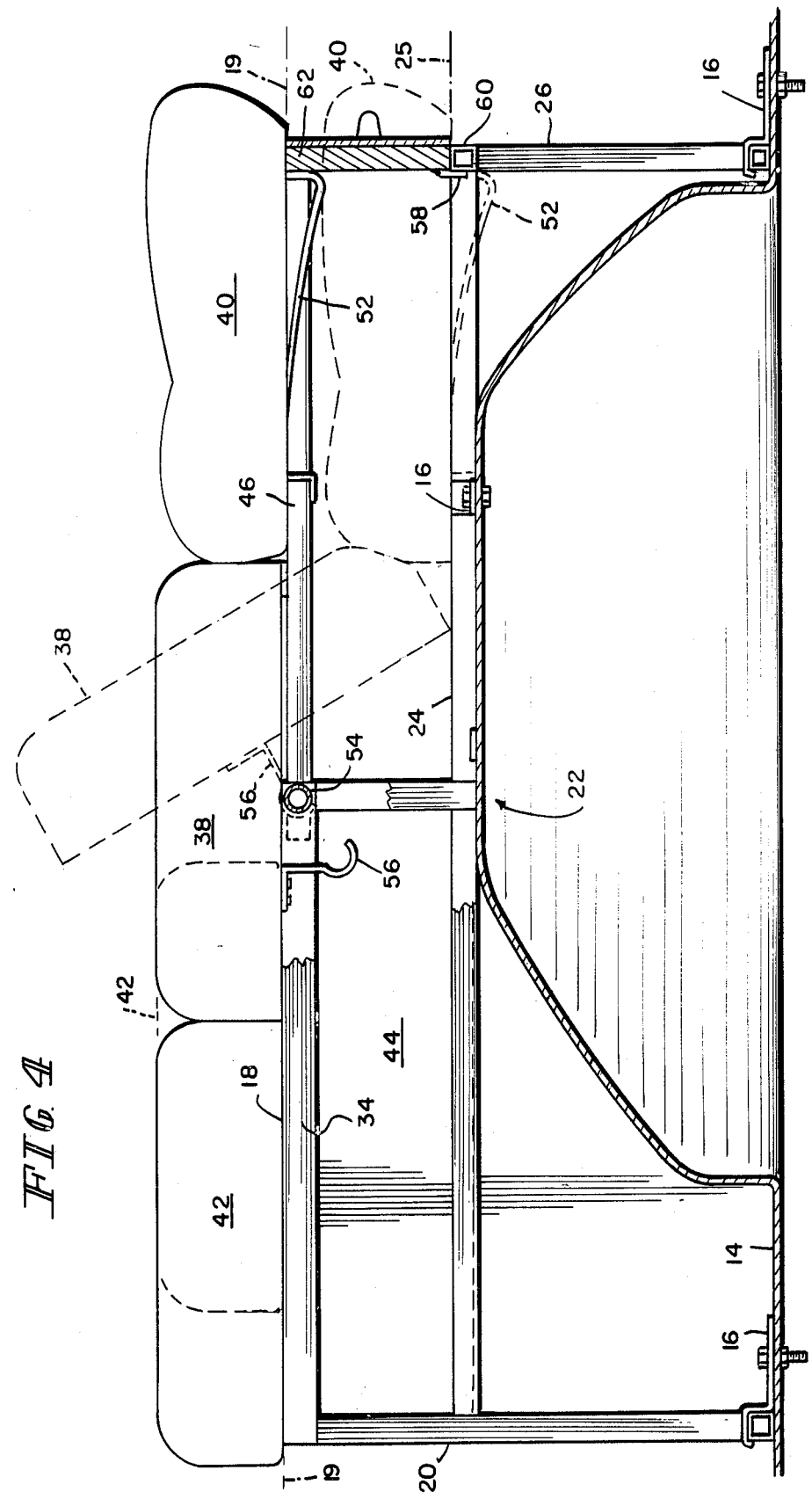
FIG. 4 is a side view of an embodiment of the present invention in which the conversion process is illustrated.

Frame element 10 is further provided with sliding support member 30 which is extendable from transition region 22 to effectively extend first support level 19 to second end 26 of the frame element. As shown in FIGS. 3 and 4, the extension of member 30 provides support for the ends of the panels when the unit is converted to the bed configuration. Handle 32 is provided to facilitate extension of member 30. In the preferred embodiment shown, support member 30 fits telescopically into tubular members 34 and 36 which form horizontal surface 18, as described in additional detail below.

Frame elements 10 and 12 are preferably fitted on facing sides with upholstered or decorative side panels 48. Front panel 50 (FIGS. 2 and 3) and a back panel, not shown in this embodiment, may also be provided for decorative or structural (i.e., cross-bracing) purposes.

FIG. 2 shows the frame elements of FIG. 1 supporting panels 38, 40 and 42 in a seat configuration. Panels 38, 40 and 42 are preferably padded cushions having frames suitable for spanning the distance between frame elements 10 and 12. Panel 38 is attached to the frame elements in a vertical or slightly inclined plane near transition region 22 in a manner which will be discussed in detail below. Panel 38 serves as a seat back when the unit is in this configuration, and also serves to separate primary storage area 44 (see FIG. 1), located between frame elements 10 and 12 and extending from first end 20 to transition region 22, from the seat area formed by panels 38 and 40. Panel 40 extends between the frame elements and is supported by surface 24 at support level 25 of frame elements 10 and 12 to form a seat bottom. Panel 42 extends between the frame elements and is supported by surface 18 at first level of support 19. Panel 42 is thus positioned above primary storage area 44 and serves to cover or conceal items in the storage area.

FIG. 3 shows the seat-bed unit of FIG. 2 converted to the bed configuration. Support 30 is extended to second end 26 and supports panel 40 and a portion of panel 38 at first support level 19. Member 46, which is representative of other members hidden by panels 38 and 40, fits telescopically into tubular member 34 to allow support member 30 to be extended and retracted to form the bed and seat configurations, respectively. The conversion operation, and additional details regarding structure of the frame elements and panels, will be described with reference to FIG. 4.

FIG. 4 shows a side view of the convertible seat-bed and storage unit and illustrates the conversion from seat to bed configurations. In the seat configuration (dotted lines), panel 40 is secured at support level 25 of frame element 10 by securing spring 52 to form the seat bottom. Panel 40 may, alternatively be slightly inclined from the horizontal when serving as a seat bottom. Panel 38 is attached to pivot bar 54 on frame element 10 by pivot hook 56 which prevents panel 38 from moving forward (i.e., toward panel 40). The bottom of panel 38 rests against surface 24. The location of hook 56 can be selected to adjust the degree of inclination of panel 38. Panel 38 serves as a seat back in this configuration and separates the seat area from primary storage area 44. Panel 42 is slidably supported at first support level 19 above primary storage area 44.

To convert to the bed configuration, panel 40 is released and pulled forward to rest on the floor in front of the unit. Panel 42 is then slid toward first end 20, and the top of panel 38 is pivoted rearwardly (i.e., toward storage area 44), coming to rest on surface 18 of frame element 10. Sliding support member 30 is extended by pulling handle 32 until sliding support stop 58 contacts tubular member 60 on second end 26 of frame element 10. Members 46 and 62 of sliding support member 30 thus provide a support surface at first support level 19, extending from transition region 22 to second end 26. Panel 40 is positioned on this support surface to complete the conversion.

In this preferred embodiment, panel 42 is supported by, but not attached to, frame elements 10 and 12. Panel 38 is attached to the frame elements by pivot hook 56 in the seat configuration (as described above) and is supported by, but not attached to, frame elements 10 and 12 in the bed configuration. Panel 40 is secured to frame elements 10 and 12 by securing spring 52, as shown in FIG. 4. Thus, each of the three panels is readily and individually removable from frame elements 10 and 12 to provide free and open access to the cargo area between the frame elements.

Primary storage area 44, which is located beneath panel 42 and behind panel 38 when the unit is in the seat configuration, is undisturbed during the seat-to-bed conversion process. Thus, it is not necessary to remove items stored in this area prior to converting from seat-to-bed or bed-to-seat configurations. Additional undisturbed storage is available in the area bounded by second support level 25, base 14 and transition region 22 (i.e. the area beneath panel 40 when the unit is in the seat configuration). Furthermore, conversion of the seat-bed unit to the bed configuration creates added storage area beneath panels 38 and 40 in the space occupied by panel 40 and the lower portion of panel 38 in the seat configuration.

The simplicity of the conversion process and the storage features described make this preferred embodiment particularly well-suited for use in van-type automotive vehicles. However, the advantages provided by these features are of equal value in other environments where limited space and storage considerations are important. Thus, it should be clearly understood that the spirit and scope of this invention are to be limited only by the terms of the following claims.

What is claimed is:

1. A convertible seat-bed and storage unit comprising:
   a. a pair of spaced apart and opposed frame elements, each of said frame elements having means for supporting a panel at a first level of support extending in a generally horizontal plane from a first end of said element to a transition region, and having means for supporting a panel at a second level of support, extending from a second end of said element to said transition region, and having means on said frame elements for extending said first level of support from said transition region to said second end;
   b. a primary storage area located between said frame elements and below said first level of support and extending from said first end toward said transition region;
   c. a first panel supported by said frame elements and extending between said transition regions of said frame elements in a generally vertical plane, said first panel being movable from said vertical plane to a generally horizontal plane at said first level of support when said seat-bed is converted to a bed configuration; and
   d. a second panel extending between and supported by said frame elements at said second level of support when said seat-bed is in said seat configuration, said second panel being movable to said first level of support when said seat-bed is converted to said bed configuration.

2. A convertible seat-bed and storage unit according to claim 1, wherein said primary storage area located between said frame elements further extends from said transition region toward said second end below said second level of support.

3. A convertible seat-bed and storage unit according to claim 1, wherein an additional storage area, located between said frame elements and below said first level of support and extending from said second end toward said transistion region, is created when said seat-bed is converted to said bed configuration.

4. A convertible seat-bed and storage unit according to claim 1, further comprising a third panel extending between and supported by said frame elements at said first level of support between said first ends and said transition regions of said frame elements.

5. A convertible seat-bed and storage unit according to claim 4, wherein said third panel is slidably supported on said frame elements.

6. A convertible seat-bed and storage unit according to claim 4, wherein said first, second and third panels are removable from said frame elements.

7. A convertible seat-bed and storage unit according to claim 1, wherein said first panel is inclined toward said primary storage area from said vertical plane when said seat-bed is in said seat configuration.

8. A convertible seat-bed and storage unit according to claim 1, wherein said first panel is pivotably attached to said frame elements.

9. A convertible seat-bed and storage unit according to claim 1, wherein said means for extending said first level of support comprises a sliding support member extendable from said transition region toward said second end of each of said frame elements.

10. A convertible seat-bed and storage unit according to claim 9 wherein said frame elements are at least partially constructed of tubular structural members and said sliding support members extend telescopically from within said tubular members.

11. A convertible seat-bed and storage unit according to claim 1, wherein said frame elements are attached to a base.

12. A convertible seat-bed and storage unit according to claim 1, wherein said frame elements are connected by cross-braces to form a unitary frame.

13. A convertible seat-bed and storage unit for mounting in a cargo space of a van-type automotive vehicle, comprising:
   a. a pair of spaced apart and opposed frame elements mounted in said cargo space, each of said frame elements having means for supporting a panel at a first level of support extending in a generally horizontal plane from a first end of said element to a transition region, and having means for supporting a panel at a second level of support, extending from a second end of said element to said transition region, and having means of said frame elements for extending said first level of support from said transition region to said second end;
   b. a primary storage area located between said frame elements and below said first level of support and extending from said first end toward said transition region;
   c. a first panel supported by said frame elements and extending between said transition regions of said frame elements in a generally vertical plane, said first panel being movable from said vertical plane to a generally horizontal plane at said first level of support when said seat-bed is converted to a bed configuration; and
   d. a second panel extending between and supported by said frame elements at said second level of support when said seat-bed is in said seat configuration, said second panel being movable to said first level of support when said seat-bed is converted to said bed configuration.

14. A convertible seat-bed and storage unit according to claim 13, wherein said primary storage area located between said frame elements further extends from said transition region toward said second end below said second level of support.

15. A convertible seat-bed and storage unit according to claim 13, wherein an additional storage area, located between said frame elements and below said first level of support and extending from said second end toward said transition region, is created when said seat-bed is converted to said bed configuration.

16. A convertible seat-bed and storage unit according to claim 13, further comprising a third panel extending between and supported by said frame elements at said first level of support between said first ends and said transition regions of said frame elements.

17. A convertible seat-bed and storage unit according to claim 16, wherein said third panel is slidably supported on said frame elements.

18. A convertible seat-bed and storage unit according to claim 16, wherein said first, second and third panels are removable from said frame elements.

19. A convertible seat-bed and storage unit according to claim 13, wherein said first panel is inclined toward said storage area from said vertical plane when said seat-bed is in said seat configuration.

20. A convertible seat-bed and storage unit according to claim 13, wherein said first panel is pivotably attached to said frame elements.

21. A convertible seat-bed and storage unit according to claim 13, wherein said means for extending said first level of support comprises sliding support members extendable from said transition region toward said second end of each of said frame elements.

22. A convertible seat-bed and storage unit according to claim 21 wherein said frame elements are at least partially constructed of tubular structural members and said sliding support members extend telescopically from within said tubular members.

* * * * *